Nov. 10, 1942. E. L. CONNERS 2,301,256
GAUGE OR DEVICE FOR CHECKING DRILL POINTS
Filed March 26, 1942
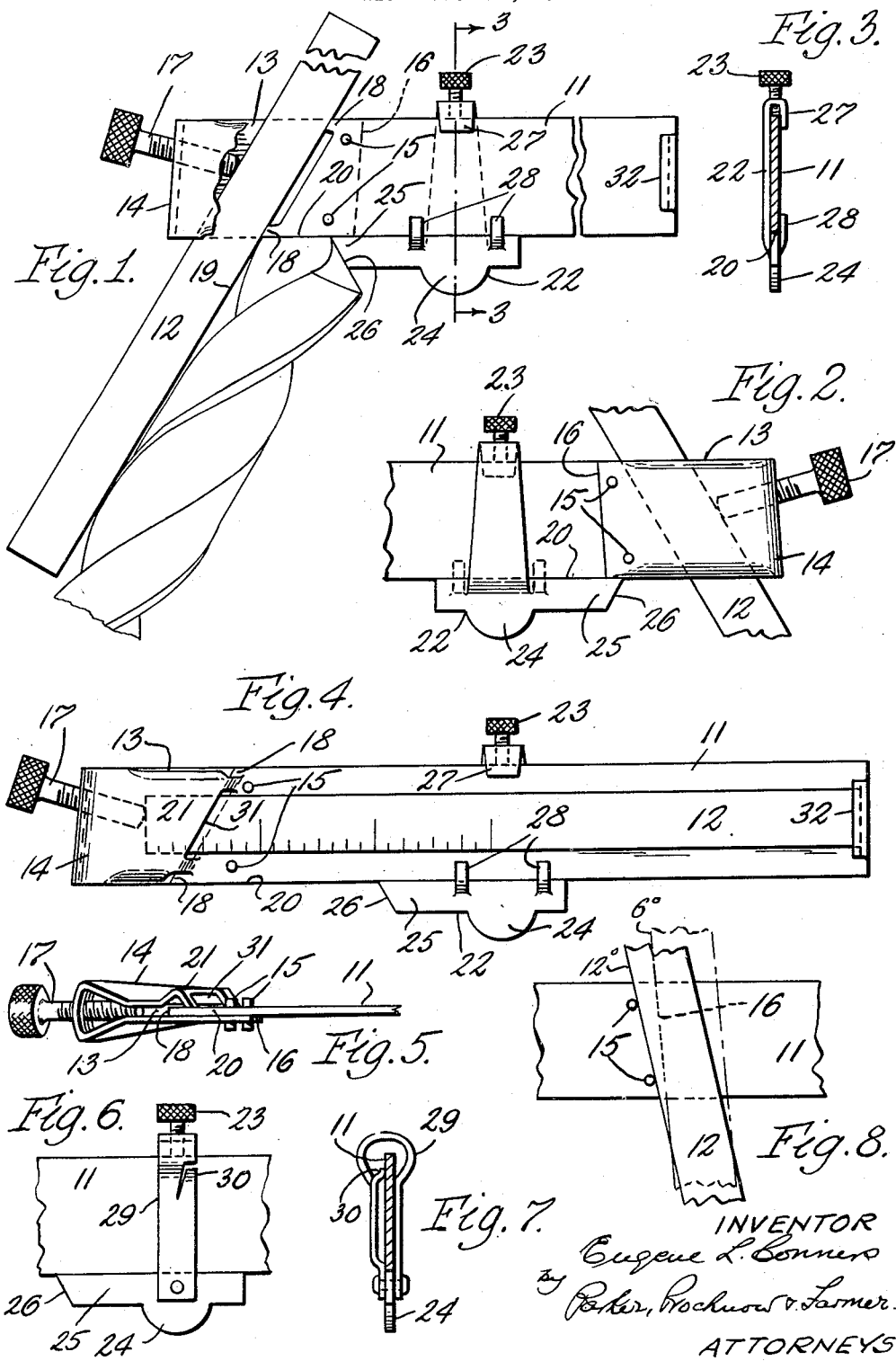

Patented Nov. 10, 1942

2,301,256

UNITED STATES PATENT OFFICE 2,301,256

GAUGE OR DEVICE FOR CHECKING DRILL POINTS

Eugene L. Conners, East Aurora, N. Y.

Application March 26, 1942, Serial No. 436,232

5 Claims. (Cl. 33—201)

This invention relates to improvements in gauges, tools or devices used for checking or gauging drill points when grinding or sharpening them in order to determine whether the cutting edges have been correctly or accurately ground or sharpened.

One object of my invention is to provide a desirable, convenient and practical gauge or device of novel construction, by means of which the correctness or accuracy of sharpening of drills of various sizes can be quickly and easily determined.

Other objects of the invention are to provide a novel and desirable gauge or device by means of which both the angles and the length of the cutting edges of drills, and also their clearance angles can be quickly and accurately checked; which is of a novel, simple and inexpensive construction; which comprises a handle and blade, or members, constructed and adapted to occupy a required angular relationship to each other for use in checking drills and also to be placed and held in a compact relation to each other to adapt the device to be conveniently stored away or carried in the pocket of the user when not in use.

Further objects and advantages of the invention will appear from the following specification of the preferred embodiment of the invention, shown in the accompanying drawing, and the novel features of the invention are set forth in the appended claims.

In said drawing:

Fig. 1 is a side elevation of a gauge embodying my invention, showing the position of the same with relation to the drill when checking the angle and length of the cutting edges of the drill point.

Fig. 2 is a reverse, fragmentary side elevation of the gauge.

Fig. 3 is a transverse section on line 3—3, Fig. 1.

Fig. 4 is a side elevation of the gauge showing the blade placed and retained in a compact relation alongside the handle member.

Fig. 5 is a fragmentary edge elevation of the handle member of the gauge.

Figs. 6 and 7 are respectively a side and transverse section showing a traveller of slightly modified construction.

Fig. 8 is a diagrammatic view illustrating the relation of the parts for gauging the clearance angles of the drill point.

The gauge or device comprises a handle or member 11 in the form of an elongated, straight-edged bar and a straight-edged blade or member 12, which is adapted to be secured in a transverse socket 13 in a head 14 at one end of the handle with the blade extending laterally from the handle at an angle thereto, as shown in Fig. 1 of the drawing.

The handle or bar is preferably made from a relatively thin, straight-edged metal bar or strip having one end portion thereof bent over upon itself and secured so as to form the looplike head 14 having the transverse retaining socket 13 therein for the blade 12. The bent-over portion of the bar which forms the loop or head 14 may be secured to the body or main portion of the bar, as by small rivets 15, and the end edge 16 of this bent-over portion preferably extends at an angle adapting it for use in gauging the clearance angle of the end faces of the drill, as hereinafter described. For instance, this edge may extend at an angle of 6 degrees to a line perpendicular to the longitudinal edge of the handle.

As shown, the blade 12 is removably secured in the head socket 13, as by a thumb screw 17 arranged at the outer end of the head to bear against one edge of the blade and clamp the blade between the screw and a guide bearing at the opposite or inner side of the socket 13, preferably formed by two lugs or parts 18 of the handle bar adjacent its opposite edges. The end faces of these lugs are in line with each other at the proper angle to hold the gauge edge 19 of the blade at the necessary obtuse angle to the gauge edge 20 of the bar 11, shown in Fig. 1, to provide the correct angle between these edges for gauging or checking the cutting edges of the drill point, as later explained.

In forming the head or loop 14, the strip from which the bar member 11 is made is preferably notched or slit at the inner sides of the lugs 18, and the portion of the strip between the lugs 18 is bent outwardly, thus forming a shoulder 21 and offsetting this side of the head loop outwardly from the face of the handle portion of the bar and the lugs 18, so that when the head loop is completed, the opposite walls thereof will be disposed in planes at opposite sides of the handle portion of the bar 11, thereby leaving the lugs 18 between the opposite side walls of the loop to form the guide bearing for the blade 12.

22 represents a slide or traveller slidably mounted on the bar 11 for adjustment toward and from the blade 12, and preferably having a thumb screw 23, by which the traveller can be releasably secured in adjusted positions on the bar. The traveller is preferably formed with a laterally projecting thumb piece or lug 24 for engagement by the user's thumb to adjust the traveller along the handle, and the traveller is provided with a point or portion 25 extending along one edge of the bar toward the blade 12. The end edge 26 of this point is disposed at the required obtuse angle, say 62 degrees, to the gauge edge of the bar, for properly checking the angle of the cutting edges of the drill point, as later explained. The traveller or slide can be formed by stamping or pressing from a thin metal blank into the form shown in Fig. 1 to provide bent guide lugs or portions 27 and 28 which slidably embrace opposite edges of the bar 11. The thumb screw passes through a threaded hole in the guide lug 27.

Figs. 6 and 7 show an alternative modified construction of the traveller in which it is made with a guide loop 29 that encircles the bar. One side of this loop is spaced away from the adjacent side of the bar sufficiently to allow the blade 12 to be passed through the loop beside the bar 11, and the loop has an inbent guide lug 30 slidably engaging the face of the bar.

The inner end or shoulder 21 of the head 14 has a slot 31 therethrough of sufficient dimensions to permit one end of the blade to be inserted through this slot into the socket 13 of the head. By removing the blade from its transverse operative position in the socket, and placing the blade alongside of the handle, with one end thereof inserted through the slot 31, and the opposite end seated in a hook-shaped abutment 32 at the opposite end of the bar 11, the gauge is reduced to a compact condition convenient for carrying in the pocket or putting away. The blade is retained in this inoperative position alongside the bar 11 by tightening the thumb screw 17 against the end of the blade in the socket 13, and thus clamping the blade between the thumb screw and the hook 32.

The use of the gauge for checking a drill may be explained as follows:

Slide the blade (or scale) 12 through the socket in the head. When the blade extends far enough from the handle bar to reach from the flute margin at the point of the drill to the margin of the next flute of the drill, tighten the thumb screw 17 until the blade is held firmly against the two guide lugs 18 in the head. Hold the drill in the left hand. Hold the gauge with the right hand and bring it down over the drill point so the blade is held along the left side of the drill. Turn the drill until one of the cutting edges at the drill point fits into the angle of the blade 12 and the bar 11, as shown in Fig. 1. If the drill has been ground to the correct angle, the cutting edge will rest along the gauge edge of the handle or bar with no crack of light showing between the cutting edge of the bar. Next, press the thumb of the right hand against the knob of the traveller and move the traveller along the bar until the point of the traveller touches the drill point, and tighten the traveller screw to hold the traveller. Turn the drill until the other side of the drill comes into place against the blade. As with the first side, if the drill has been ground to the correct angle, when the second cutting edge is fitted into the angle of the blade and bar, the cutting edge should rest along the gauge edge of the bar with no crack of light showing between the cutting edge and the bar. Also, if both cutting edges are of equal length the drill should just touch the point of the traveller with no crack of light showing between the drill and the point of the traveller.

On a large drill the web at the dead center of the drill may be thicker than the gauge. After the angle of the drill has been checked, turn the drill very slightly forward so that the side of the drill still rests along the blade of the gauge and one cutting edge rests in the angle of the blade and the bar, and the traveller can be moved until the point of the traveller rests against the other cutting edge of the drill. Now turn the drill over, and if the two cutting edges are the same length, the drill should just touch the point of the traveller with no crack of light between the point of the traveller and the drill.

To check the clearance angle of the drill, remove the blade from the head socket and place it across the handle and hold it in place against the projecting rivet ends which will establish a clearance angle of say twelve degrees. If a six degree angle is desired, place the blade against the inner end edge of the head, (see Fig. 8). Bring the gauge down over the drill so the blade rests along the left side of the drill and the bar 11 touches the point of the drill. Turn the drill so the surface of the drill point back of the cutting edge can be seen. If the drill has the proper clearance, the angle at the circumference of the drill should be parallel with the handle. Instead of removing the blade from the head, another bar (or scale) similar to the blade my be used.

In order to reduce the size of the gauge, when its use is finished, loosen the thumb screw, remove the blade from the head socket, and lay the blade along the handle bar 11. Insert one end of the blade into the slot in the head and loosen the thumb screw until the other end of the blade slips into the hook on the other end of the handle. Then tighten the screw sufficiently to hold the blade in the hook.

The gauge is complete—it checks the angles of the cutting edges, the length of the cutting edges, and the clearance angles.

The operation of checking the drill point is quick and positive. With its use it can be definitely determined whether the drill is correctly ground or not correctly ground. There is no need of saying the drill point is "as good as can be measured." The gauge can be adjusted to check a worn down drill or one with a tapered shank. It can be used on drills from the smallest to fairly large sizes. It can be reassembled so it is compact enough to fit in the pocket. The blade may be provided with scale graduations if desired. Although the blade or handle bar may be made with a scale, there is no need of a scale on any part of the gauge.

Gauges with different angles may be made for specially ground drills, and the gauge may be made in a wide variety of dimensions.

I claim as my invention:

1. A gauge for the purpose described comprising a bar having straight parallel longitudinal edges one of which constitutes a gauge edge, a head at one end of said bar having a socket extending transversely to said gauge edge and having a guide bearing for a blade at the inner side of the socket, a blade having a straight longitudinal gauge edge seated in said socket, a screw in the outer end of said head which clamps said blade against said guide bearing and holds said gauge edge of the blade at an obtuse angle to the gauge edge of the bar, and a traveller adjustable along said bar toward and from said blade and having at a portion next to said blade a gauge edge disposed at an obtuse angle opposite to that of the gauge edge of the blade.

2. A gauge as set forth in claim 1, in which said guide bearing in the socket is formed by spaced parts adjacent opposite ends of the socket and said screw engages the blade at a point between said spaced parts making a three point bearing for the blade.

3. A gauge as set forth in claim 1, in which said head and socket are formed by integral bent-over portions of said bar.

4. A gauge as set forth in claim 1, in which said head has a slot in one side thereof arranged to receive one end of said blade when the blade is placed lengthwise along one side of said bar, the blade when so placed being held between said screw and an opposing abutment on said bar.

5. A gauge as set forth in claim 1, in which said head has projecting parts at its inner end portion disposed so that a blade held against said parts will be positioned at a proper angle to said bar for gauging the cutting clearance of the drill point.

EUGENE L. CONNERS.